(12) United States Patent
Matsushita et al.

(10) Patent No.: US 7,607,520 B2
(45) Date of Patent: Oct. 27, 2009

(54) ELECTRIC DISK BRAKE FOR VEHICLE

(75) Inventors: Manabu Matsushita, Nagano (JP);
Akihiko Koike, Saitama (JP)

(73) Assignees: Nissin Kogyo Co., Ltd., Nagano (JP);
Honda Motor Co., Ltd., Tokyo (JP)

( * ) Notice: Subject to any disclaimer, the term of this patent is extended or adjusted under 35 U.S.C. 154(b) by 412 days.

(21) Appl. No.: 11/496,002

(22) Filed: Jul. 28, 2006

(65) Prior Publication Data

US 2007/0034459 A1    Feb. 15, 2007

(30) Foreign Application Priority Data

Aug. 4, 2005    (JP)    ............... 2005-226606

(51) Int. Cl.
*F16D 55/08*    (2006.01)
*B60L 7/00*    (2006.01)

(52) U.S. Cl. ...................... 188/72.8; 188/162

(58) Field of Classification Search ............... 188/72.6, 188/72.7, 72.8, 156, 157, 158, 159, 160, 188/161, 162; 310/239, 249, 112, 251, 252
See application file for complete search history.

(56) References Cited

U.S. PATENT DOCUMENTS

| | | | | |
|---|---|---|---|---|
| 4,049,984 A | * | 9/1977 | Ishii et al. ................. | 310/112 |
| 4,895,227 A | * | 1/1990 | Grenier et al. .............. | 188/156 |
| 4,997,237 A | * | 3/1991 | Ricker et al. .............. | 303/115.2 |
| 5,219,214 A | * | 6/1993 | Savage et al. ............... | 188/162 |
| 5,528,093 A | * | 6/1996 | Adam et al. ................ | 310/239 |
| 5,915,504 A | * | 6/1999 | Doricht ..................... | 188/158 |
| 6,394,235 B1 | | 5/2002 | Poertzgen et al. | |
| 6,573,625 B2 | * | 6/2003 | Shimizu et al. ............. | 310/239 |
| 6,809,454 B2 | * | 10/2004 | Adachi ...................... | 310/249 |
| 7,347,115 B2 | * | 3/2008 | Otaki et al. ................ | 74/89.38 |
| 2003/0178908 A1 | * | 9/2003 | Hirano et al. .............. | 310/239 |

FOREIGN PATENT DOCUMENTS

| | | |
|---|---|---|
| EP | 0712195 | 5/1996 |
| EP | 0849866 | 6/1998 |
| JP | 2001-510760 | 8/2001 |
| WO | WO 99/05011 | 2/1999 |

\* cited by examiner

*Primary Examiner*—Thomas J Williams
(74) *Attorney, Agent, or Firm*—Carrier, Blackman & Associates P.C.; William D. Blackman; Joseph P. Carrier (57) ABSTRACT

An electric disk brake for a vehicle, includes an electric motor in which a brush coming into slide contact with a commutator provided on an output shaft rotatably supported in a motor housing is held by a brush holder secured to the motor housing, and a rotation angle detection sensor for detecting a rotation angle of the electric motor. A brake piston driven by the electric motor is slidably fitted to a caliper body. A detected portion to be detected by the rotation angle detection sensor housed and placed in the motor housing is provided on the output shaft in the motor housing. Thus, the rotation angle detection sensor can be provided without any special waterproof seal and with a reduced number of components.

7 Claims, 12 Drawing Sheets

ELECTRIC DISK BRAKE FOR VEHICLE

CROSS-REFERENCE TO RELATED APPLICATION

The present invention claims priority under 35 USC 119 based on Japanese patent application No. 2005-226606, filed on Aug. 4, 2005. The subject matter of this priority document is incorporated by reference herein.

BACKGROUND OF THE INVENTION

1. Field of the Invention

The present invention relates to an electric disk brake for vehicle, comprising: an electric motor in which a brush that comes into slide contact with a commutator provided on an output shaft rotatably supported in a motor housing is held by a brush holder secured to the motor housing; a rotation angle detection sensor for detecting a rotation angle of the electric motor, and a brake piston driven by the electric motor being slidably fitted to a caliper body.

2. Description of the Related Art

An electric disk brake has been known from, for example, Published Japanese Translation No. 2001-510760 of PCT Application No. PCT/EP98/04582, in which a reducer provided between an electric motor and a brake piston is housed in a housing mounted to a caliper body of a disk brake, and a rotation angle detection sensor for detecting a rotation angle of the electric motor is housed in the housing in a position corresponding to one end of an output shaft protruding from a motor housing of the electric motor into the housing.

SUMMARY OF THE INVENTION

However, in the electric disk brake disclosed in the above-mentioned publication, the rotation angle detection sensor is provided outside the electric motor, which requires a measure to provide a waterproof seal of the rotation angle detection sensor, thereby increasing the number of components.

The present invention been achieved in view of such circumstances, and has an object to provide an electric disk brake for vehicle in which a rotation angle detection sensor can be provided without requiring any special waterproof seal and with a reduced number of components.

In order to achieve the above object, according to a first feature of the present invention, there is provided an electric disk brake for vehicle, comprising: an electric motor in which a brush that comes into slide contact with a commutator provided on an output shaft rotatably supported in a motor housing is held by a brush holder secured to the motor housing; and a rotation angle detection sensor for detecting a rotation angle of the electric motor; a brake piston driven by the electric motor being slidably fitted to a caliper body, wherein a detected portion to be detected by the rotation angle detection sensor housed and placed in the motor housing is provided on the output shaft in the motor housing.

A pulser 58 of an embodiment corresponds to the "detected portion" of the present invention.

With the first feature, the rotation angle detection sensor that detects the detected portion provided on the output shaft in the motor housing and thus detects the rotation angle of the electric motor is housed in the motor housing with a waterproof seal. This eliminates the need for a special waterproof seal for the rotation angle detection sensor, thereby reducing the number of components.

According to a second feature of the present invention, in addition to the first feature, the motor housing includes a bottomed cylindrical yoke having a plurality of magnets on an inner periphery thereof, and a lid plate that is connected to the yoke and holds the brush holder between itself and the yoke; and the rotation angle detection sensor is housed and secured in the recess provided in the brush holder so as to be covered with the lid plate.

With the second feature, the yoke and the lid plate are connected via the brush holder, and thus the rotation angle detection sensor is only housed and secured in the recess of the brush holder before assembly of the motor housing, thereby facilitating assembly of the rotation angle detection sensor.

According to a third feature of the present invention, in addition to the first or second feature, the detected portion is provided on the output shaft between the commutator and a motor bearing provided between the output shaft and the motor housing outside the commutator.

With the third feature, the detected portion is provided on the output shaft extremely close to the motor bearing, thereby increasing detection accuracy of the rotation angle detection sensor while minimizing run-out of the detected portion.

According to a fourth feature of the present invention, in addition to the first, second or third feature, a coupler for removably mounting an external connector is integrally provided in the brush holder.

With the fourth feature, the brush holder and the coupler are integrally formed to simplify the structure and reduce the number of components.

The above-mentioned object, other objects, characteristics, and advantages of the present invention will become apparent from a preferred embodiment, which will be described in detail below by reference to the attached drawings.

DESCRIPTION OF THE PREFERRED EMBODIMENT

Figure 1:
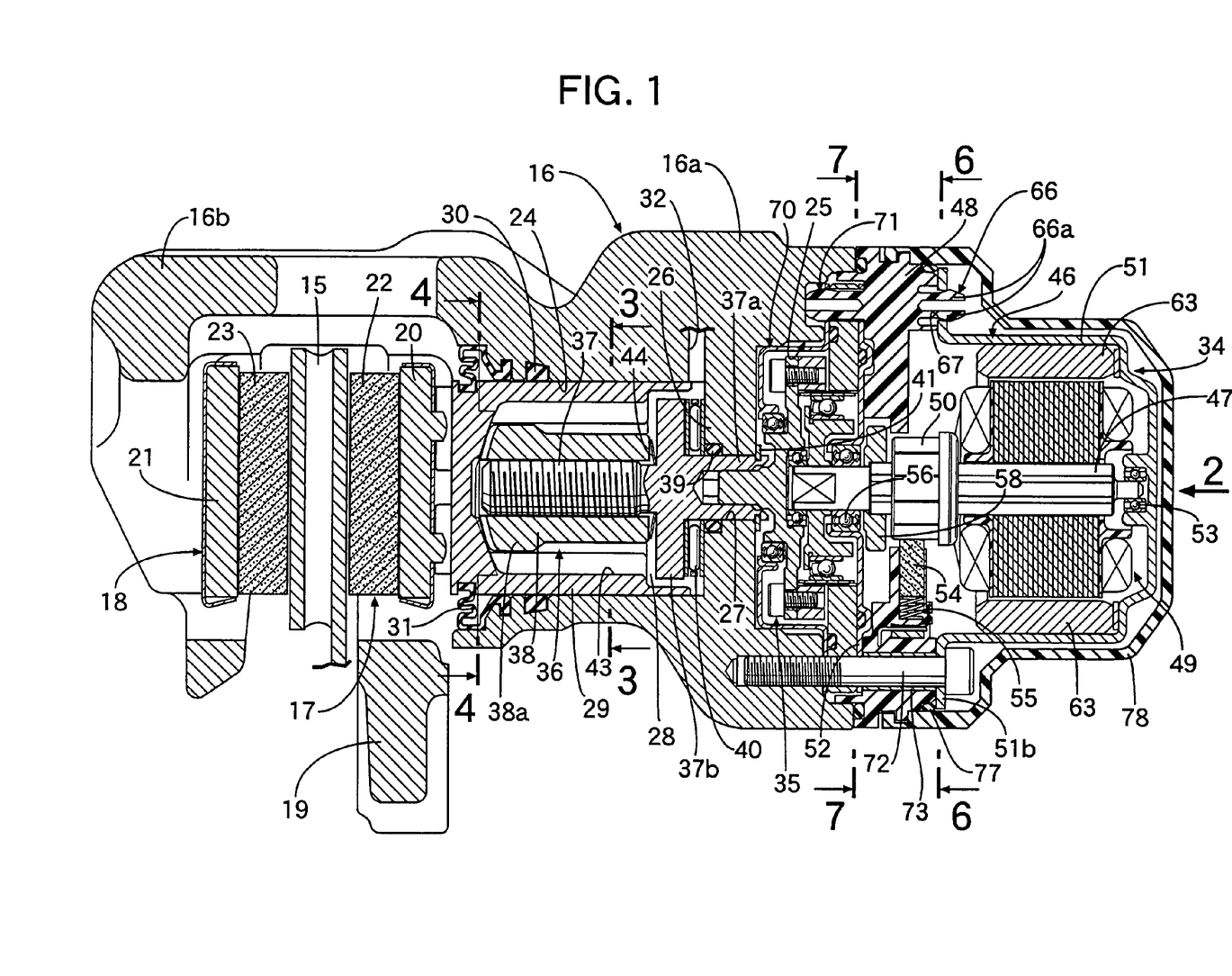
FIG. 1 is a vertical sectional view of a disk brake for a vehicle, according to one embodiment of the present invention, taken along the line 1-1 in FIG. 2.
Figure 2:
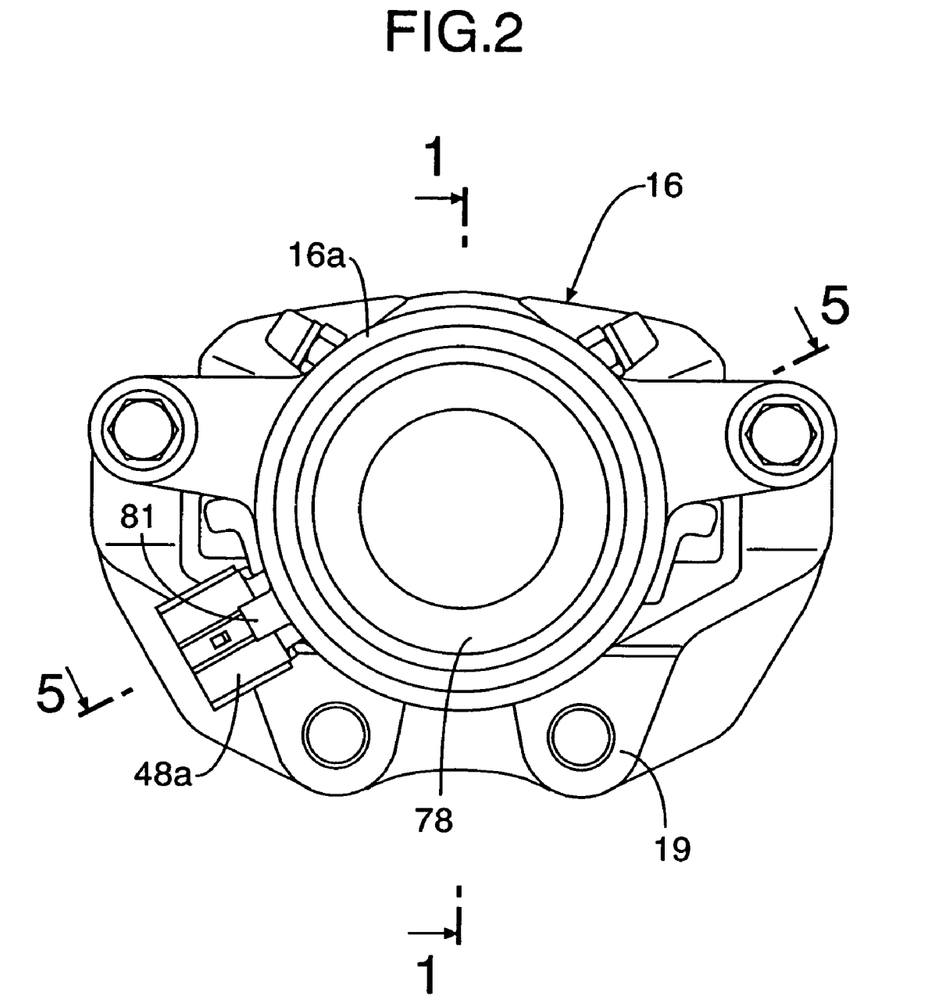
FIG. 2 is a view taken in the direction of arrow 2 in FIG. 1.

First, in FIGS. 1 and 2, a disk brake for a vehicle can provide a service braking state by a hydraulic pressure and a parking braking state by an operation with an electric motor 34. The disk brake includes a disk rotor 15 that rotates with an unshown wheel, a caliper body 16, and a pair of friction pads 17 and 18 that are arranged to face opposite sides of the disk rotor 15 and placed between the disk rotor 15 and the caliper body 16.

The caliper body 16 includes a housing portion 16a slidably supported along an axis of the disk rotor 15 by a bracket 19 mounted to a vehicle body, and an arm portion 16b extending from the housing portion 16a to the opposite side over the disk rotor 15.

The friction pad 17 is formed into a bottomed cylindrical shape having an axis parallel to the axis of the disk rotor 15, and faces one side of the disk rotor 15 on the side of the housing portion 16a. The friction pad 17 includes a lining 22 that is provided on a back metal 20 to come into slide contact with the disk rotor 15 and that exerts a friction force. The friction pad 18 faces the other side of the disk rotor 15 on the side of the arm portion 16b. The friction pad 18 includes a lining 23 that is provided on a back metal 21 to come into slide contact with the disk rotor 15 and that exerts a friction force. The friction pads 17 and 18 are held by the bracket 19 so as to be movable along the axis of the disk rotor 15.

Provided in the housing portion 16a of the caliper body 16 are a cylinder hole 24 that has an axis parallel to the axis of the disk rotor 15 and opens on the side of the friction pad 17, a housing recess 25 that opens on the side opposite from the friction pad 17, and a bulkhead 26 placed between the cylinder hole 24 and the housing recess 25. The cylinder hole 24 and the housing recess 25 are formed to have circular sections on the same axis. A through hole 27 that coaxially connects the cylinder hole 24 and the housing recess 25 is provided in the center of the bulkhead 26.

A bottomed cylindrical brake piston 29 that forms a hydraulic chamber 28 between itself and the bulkhead 26 and has a closed front end, is axially slidably housed in the cylinder hole 24 so that the front end abuts against the back metal 20 of the friction pad 17. The front end of the brake piston 29 engages the back metal 20 so as to prevent rotation in the cylinder hole 24.

An annular piston seal 30 mounted between the caliper body 16 and the brake piston 29 is mounted to an inner surface of the cylinder hole 24. An annular dust boot 31 is provided between an opening end of the cylinder hole 24 and the brake piston 29. A hydraulic passage 32 that introduces a hydraulic pressure into the hydraulic chamber 28 is provided in the housing portion 16a.

An output of an electric motor 34 that produces power for moving the friction pads 17 and 18 toward and away from the disk rotor 15 is transmitted to the brake piston 29 via a reduction mechanism 35 that reduces the speed of the output and a screw mechanism 36. The screw mechanism 36 is housed in the housing portion 16a of the caliper body 16 so as to be placed behind the brake piston 29. The reduction mechanism 35 is supported by the electric motor 34 and housed in the housing recess 25. The electric motor 34 is mounted to the housing portion 16a of the caliper body 16 on the side opposite from the disk rotor 15.

The screw mechanism 36 includes a screw shaft 37 coaxial with the cylinder hole 24, and a nut 38 that relatively nonrotatably engages the brake piston 29 and is screwed onto the shaft 37. At a rear end of the screw shaft 37 on the side opposite from the brake piston 29, a connecting shaft portion 37a that rotatably passes through the through hole 27 in the bulkhead 26 is coaxially and integrally provided, and a flange 37b protruding radially outward is integrally provided. An O-ring 39 is mounted between the bulkhead 26 and the connecting shaft portion 37a in the housing portion 16a. A thrust bearing 40 is mounted between the flange 37b and the bulkhead 26. A snap ring 41 that abuts against a surface of the bulkhead 26 on the side of the housing recess 25 is mounted to an outer periphery of a protruding portion of the connecting shaft portion 37a on the side of the housing recess 25.

Figure 3:
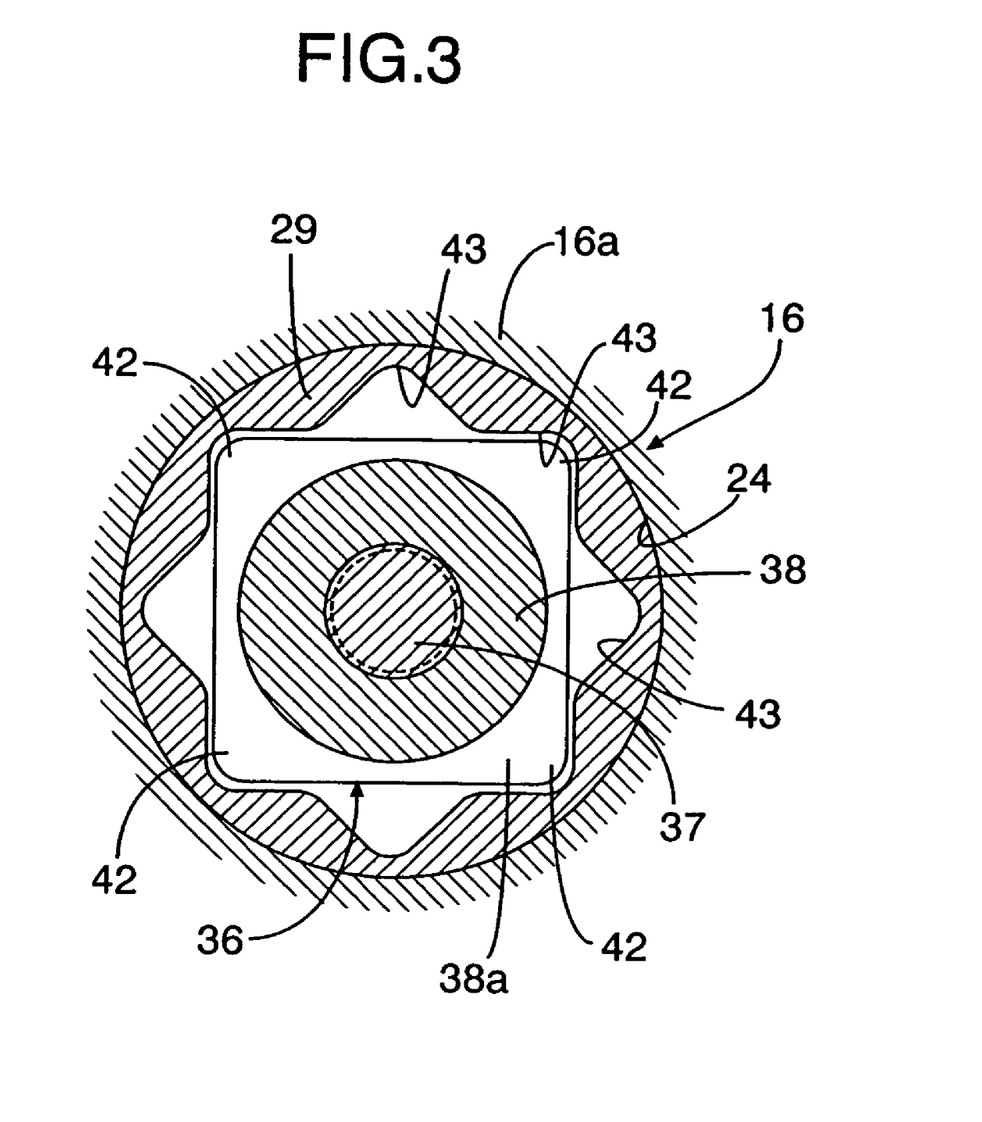
FIG. 3 is a sectional view taken along the line 3-3 in FIG. 1.
Figure 4:
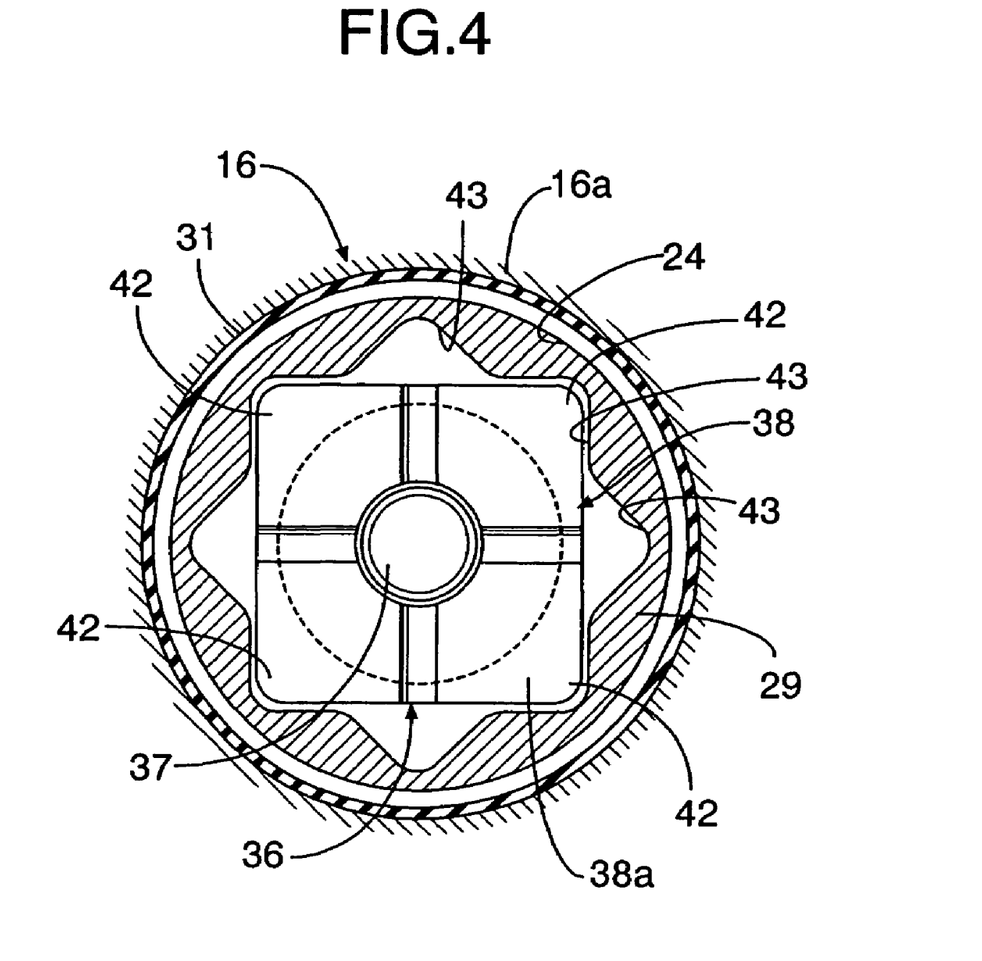
FIG. 4 is a sectional view taken along the line 4-4 in FIG. 1.

With reference to FIGS. 3 and 4 together, the screw shaft 37 is screwed into the nut 38 that surrounds the screw shaft 37 in the brake piston 29. The nut 38 has, at a front end thereof, an engaging portion 38a having a regular polygonal outer periphery. In this embodiment, the nut 38 has an engaging portion 38a having a square outer periphery. A front end surface of the engaging portion 38a abuts against an inner surface of the front end of the brake piston 29.

On the other hand, lock grooves 43 of a number that is an integral multiple of (twice in this embodiment) the number of a plurality of (four in this embodiment) corners 42 of the engaging portion 38a are provided in the inner periphery of the bottomed cylindrical brake piston 29. The lock grooves 43 axially extend at circumferentially equal intervals and selectively engage the corners 42 in a plurality of positions with circumferentially displaced phases. Specifically, the inner periphery of the brake piston 29 is formed into a shape corresponding to the outer periphery of the engaging portion 38a and having a plurality of overlapping regular polygons with displaced phases. In this embodiment, the inner periphery has a star shape formed by overlapping two squares with phases displaced by 45°.

As clearly shown in FIG. 1, a Belleville spring 44 that urges the nut 38 in an advancing direction is provided between the flange 37b of the screw shaft 37 and the nut 38.

In such a screw mechanism 36, when the power from the electric motor 34 is reduced in speed by the reduction mechanism 35, and the reduced power for rotation in one direction is transmitted to the screw shaft 37, the disk rotor 15 is held and pressed from opposite sides by the friction pads 17 and 18 due to action and reaction caused by the brake piston 29 sliding axially forward in a state where rotation of the brake piston 29 and the nut 38 is prevented, thereby providing a braking force. The screw shaft 37 is rotated in the other direction to cause the brake piston 29 to slide axially backward, thereby releasing the braking state.

Figure 5:
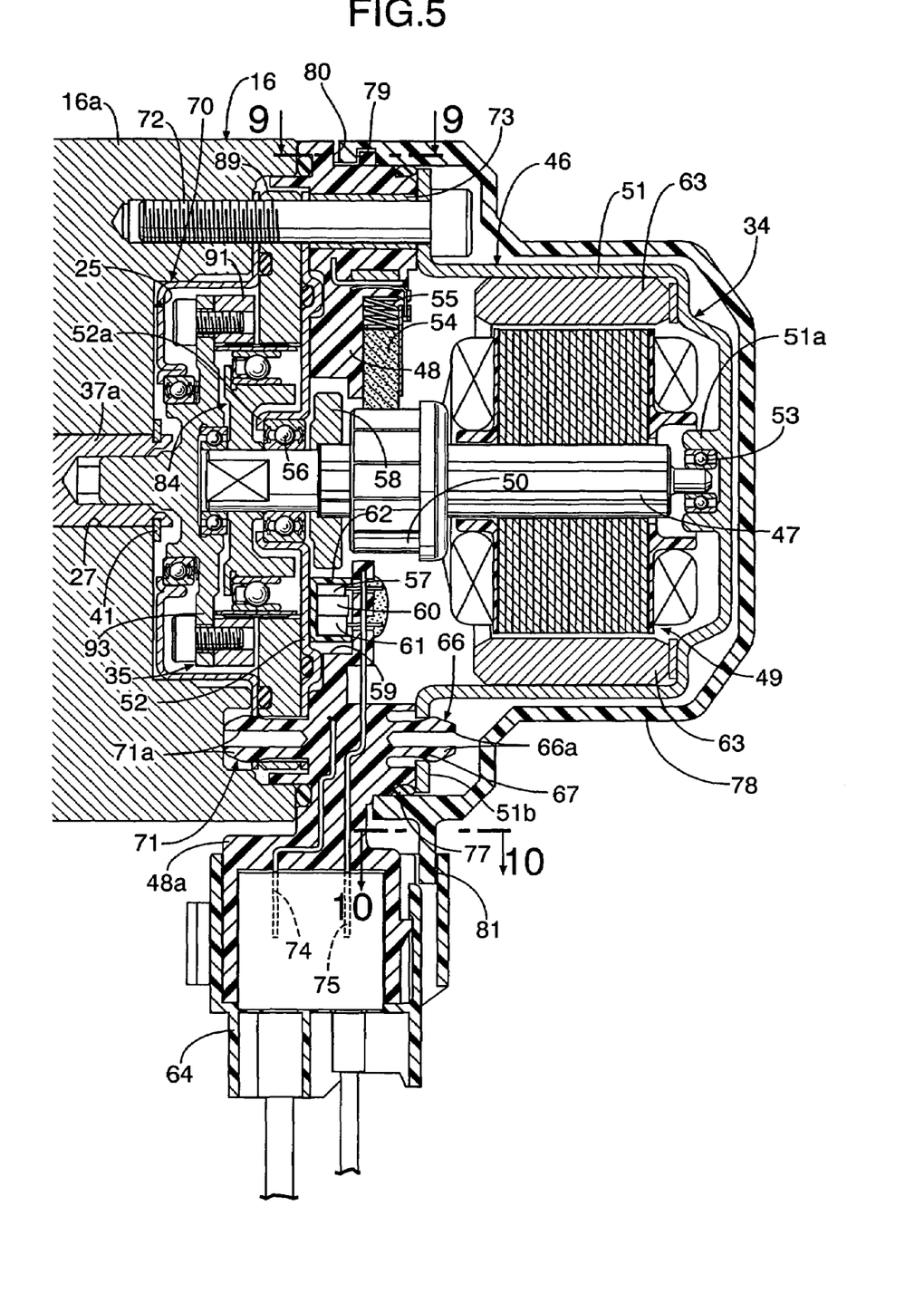
FIG. 5 is a sectional view of an electric motor and a reducer taken along the line 5-5 in FIG. 2.

Also with reference to FIG. 5, the electric motor 34 includes a motor housing 46 mounted to the housing portion 16a of the caliper body 16, an output shaft 47 rotatably supported in the motor housing 46 and provided with an armature 49 having a commutator 50, and a brush holder 48 secured to the motor housing 46, and is rotatable in both forward and reverse directions.

The motor housing 46 includes a bottomed cylindrical yoke 51 coaxially surrounding the armature 49, and a lid plate 52 that is connected to the yoke 51 and holds the brush holder 48 between itself and an opening end of the yoke 51 (i.e., covers the opening end of the yoke 51). A plurality of magnets 63 are secured to an inner periphery of the yoke 51 in a portion corresponding to the armature 49.

A cylindrical bearing housing 51a is integrally provided in an inner surface of the center of a closed end of the bottomed cylindrical yoke 51. One end of the output shaft 47 is rotatably supported in the bearing housing 51a via a first motor bearing 53. A flange 51b protruding radially outward is integrally provided in the opening end of the yoke 51.

Figure 6:
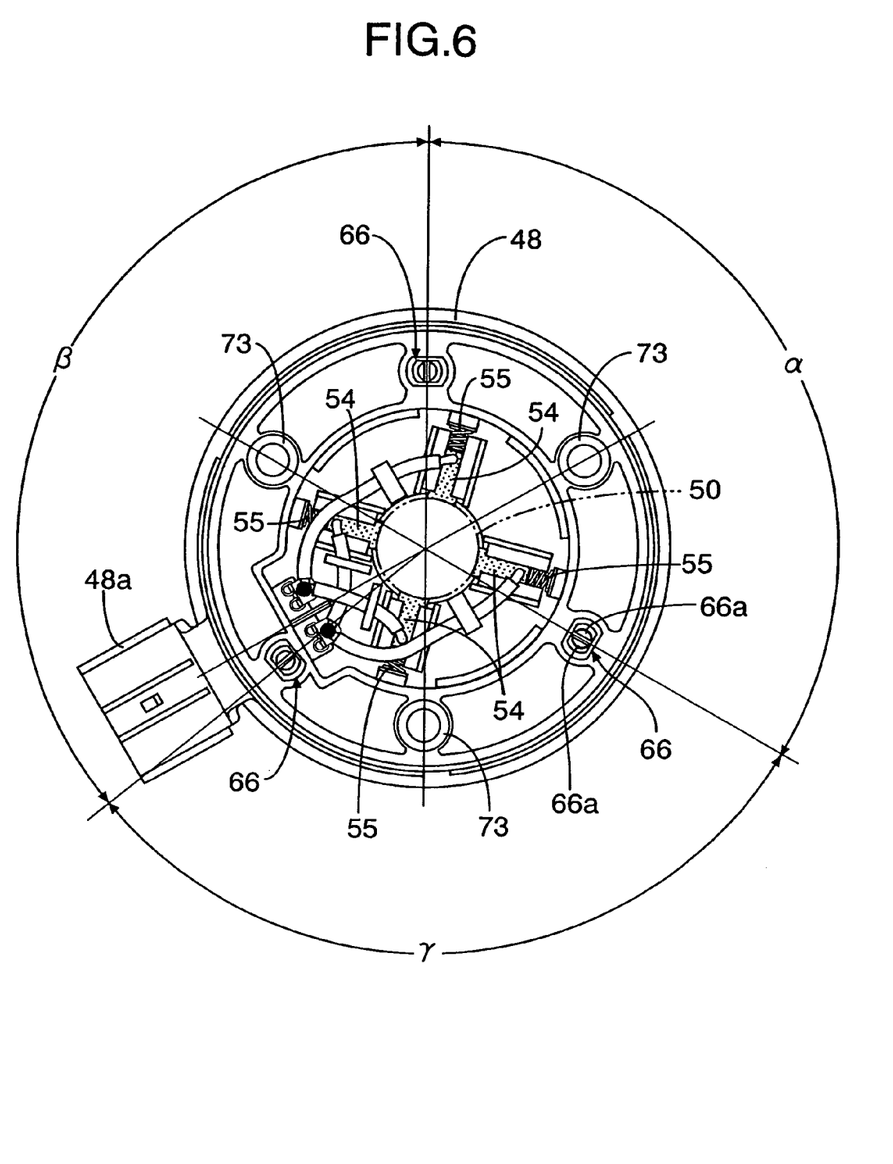
FIG. 6 is a view of a brush holder taken in the direction of arrow along the line 6-6 in FIG. 1.

Also with reference to FIG. 6, the brush holder 48 is formed of, for example, synthetic resin into a ring shape so as to surround the output shaft 47 in a portion substantially corresponding to the commutator 50, and abuts against the flange 51b of the yoke 51. A plurality of, for example, four brushes 54 that come into slide contact with the commutator 50 are held by the brush holder 48. The brushes 54 are urged toward the side to come into slide contact with the commutator 50 by springs 55 provided under compression between the brushes 54 and the brush holder 48.

The lid plate 52 is formed into a ring plate shape with the brush holder 48 being held between the lid plate 52 and the flange 51b. The other end of the output shaft 47 rotatably passes through the center of the lid plate 52, and protrudes toward the reduction mechanism 35. A cylindrical bearing housing 52a is integrally provided in the center of the lid plate 52. A portion of the output shaft 47 corresponding to the lid plate 52 is rotatably supported in the bearing housing 52a via a second motor bearing 56 having a seal.

A rotation angle of the electric motor 34 is detected by a rotation angle detection sensor 57 housed and placed in the motor housing 46. A pulser 58 to be detected by the rotation angle detection sensor 57 is provided on the output shaft 47 in the motor housing 46. Further, the pulser 58 is provided on the output shaft 47 between the commutator 50 and the second motor bearing 56 which is provided between the commutator 50 and the lid plate 52 of the motor housing 46.

Figure 7:
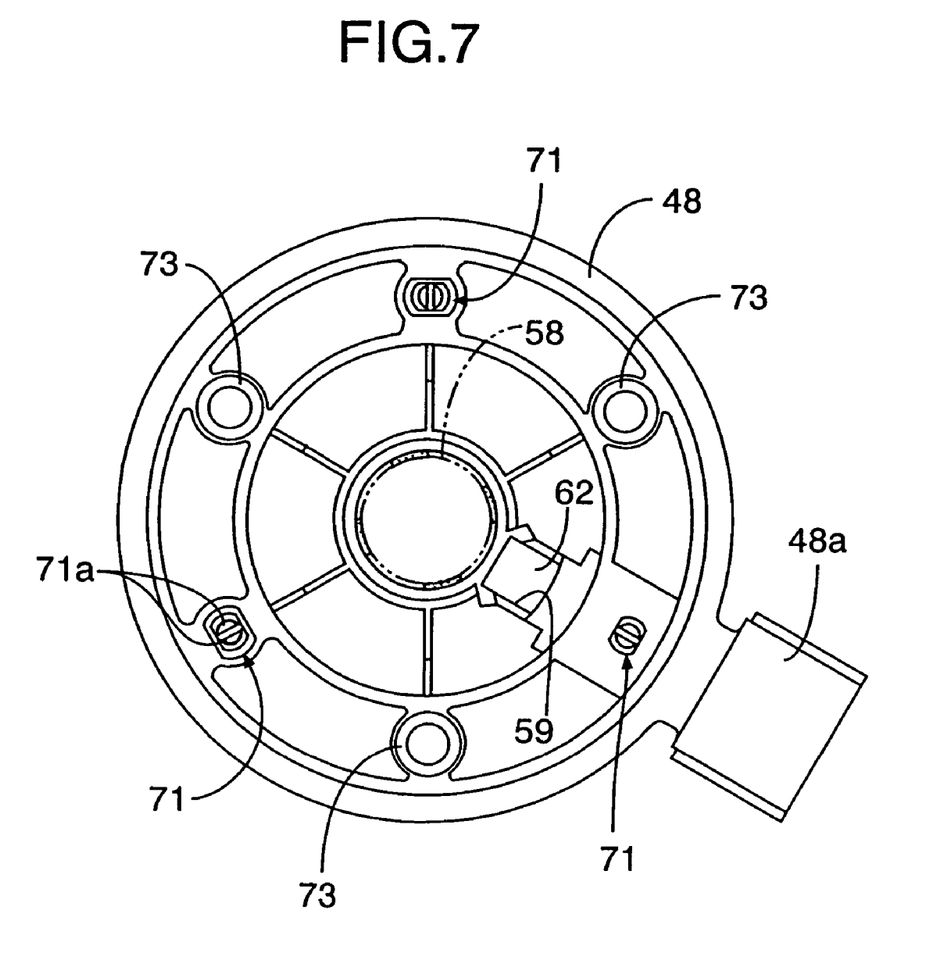
FIG. 7 is a view of the brush holder taken in the direction of arrow along the line 7-7 in FIG. 1.

Also with reference to FIG. 7, a recess 59 that opens in an inner periphery of the brush holder 48 in a portion corresponding to the pulser 58 and is covered with the lid plate 52 is provided in the brush holder 48. The rotation angle detection sensor 57 is housed and secured in the recess 59 and is circumferentially disposed (on a substantially same circumferential plane) from the pulser 58 with respect to central axis of the output shaft 47 in the motor housing 46. The rotation angle detection sensor 57 is housed in a resin case 62 together with a magnet 60 and a capacitor 61. The resin case 62 is housed and secured in the recess 59 by bonding or the like.

Figure 8:
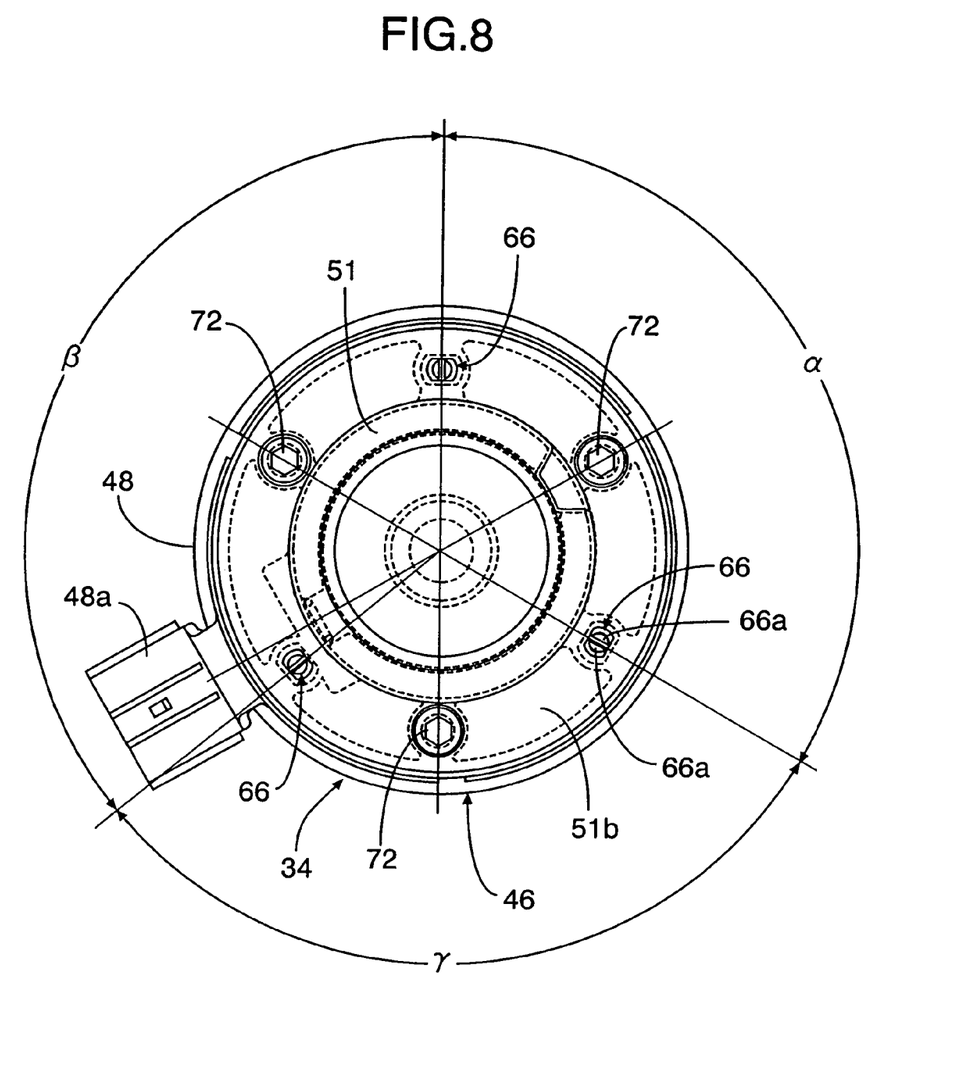
FIG. 8 is a view of a temporarily secured state of the brush holder and a yoke with a motor cover being removed, seen from the same direction as in FIG. 6.

Also with reference to FIG. 8, repulsive engaging portions 66 that can repulsively engage the flange 51b of the yoke 51 are projectingly provided in a plurality of (three in this embodiment) circumferentially spaced positions in the brush holder 48. The repulsive engaging portions 66 are projectingly provided in circumferentially spaced positions in the brush holder 48 so that intervals between at least one of the repulsive engaging portions 66 and other adjacent ones of the repulsive engaging portions 66 are respectively different from remaining intervals between the repulsive engaging portions 66. In this embodiment, the three repulsive engaging portions 66 are projectingly provided in the brush holder 48, and thus angle spaces $\alpha$, $\beta$, $\gamma$ between the repulsive engaging portions 66 are different from each other, and for example, $\alpha$ is 120°, $\beta$ is 130°, and $\gamma$ is 110°.

Further, the repulsive engaging portions 66 each include a pair of engaging claws 66a and 66a that face each other. The repulsive engaging portions 66 are inserted into engaging holes 67 provided in the flange 51b of the yoke 51 to repulsively engage the flange 51b.

The reduction mechanism 35 is housed in a case 70 that includes, as a component, the lid plate 52 constituting part of the motor housing 46. A plurality of repulsive engaging portions 71 that repulsively engage the case 70 to temporarily secure the case 70 to the electric motor 34 are projectingly provided in the brush holder 48.

The repulsive engaging portions 71 each include a pair of engaging claws 71a and 71a that face each other. The repulsive engaging portions 71 are projectingly provided in the brush holder 48 at circumferentially equal intervals as clearly shown in FIG. 7.

Thus, the brush holder 48 can be temporarily secured to the yoke 51 by the repulsive engaging portions 66, and the case 70 can be temporarily secured to the brush holder 48 by the repulsive engaging portions 71. Specifically, the motor housing 46, the brush holder 48, and the case 70 can be temporarily secured via the brush holder 48. The motor housing 46, the brush holder 48, and the case 70 that are temporarily secured are mounted to the housing portion 16a of the caliper body 16 in common by a plurality of (for example, three) mounting bolts 72. Cylindrical sleeves 73 made of metal through which the mounting bolts 72 are inserted are embedded in the brush holder 48.

A coupler 48a that laterally protrudes from an outer periphery of the motor housing 46 is projectingly provided in the brush holder 48. Connection terminals 74 connected to the brushes 54 and a connection terminal 75 connected to the rotation angle detection sensor 57 are placed in the coupler 48a. A female external connector 64 can be removably fitted and connected to the male coupler 48a.

A bottomed cylindrical motor cover 78 is mounted to the brush holder 48 constituting part of the motor housing 46 via an annular seal member 77 so as to cover at least the metal yoke 51 placed outside the caliper body 16 and the mounting bolts 72 in the motor housing 46.

Further, the motor cover 78 is bayonet-connected to the brush holder 48 provided so that the coupler 48a for removably fitting and connecting the external connector 64 laterally protrudes.

Specifically, engaging protrusions 79 are projectingly provided in a plurality of (for example, two) positions at circumferentially equal intervals in an inner surface of an opening end of the motor cover 78, and engaging recesses 80 for bayonet-engagement of the engaging protrusions 79 are provided in the outer periphery of the brush holder 48.

Figure 9:
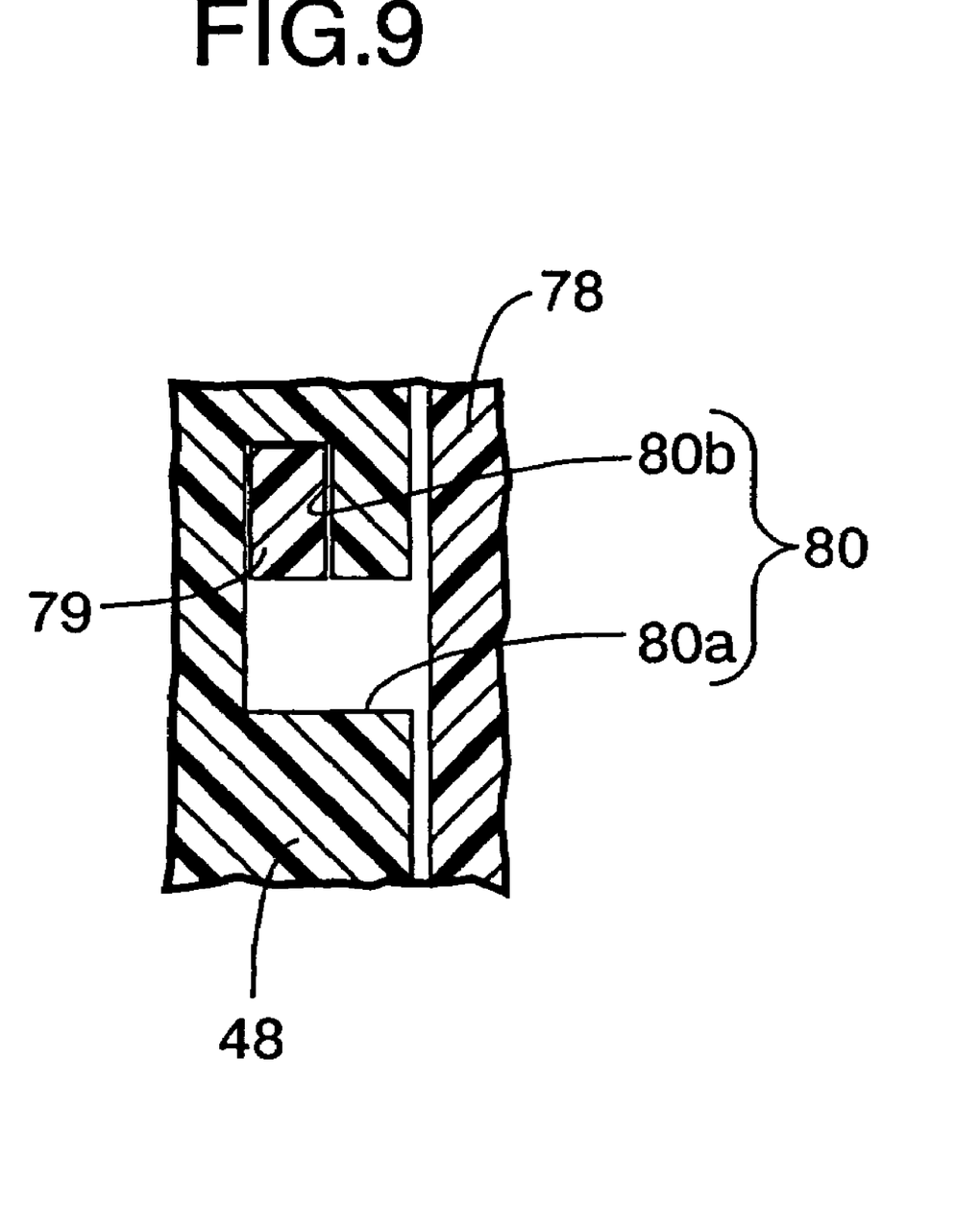
FIG. 9 is an enlarged sectional view taken along the line 9-9 in FIG. 5.

In FIG. 9, the engaging recess 80 provided in the outer periphery of the brush holder 48 is formed into a substantially L-shape constituted by a groove portion 80a that axially extends so that the motor cover 78 is axially displaced relative to the brush holder 48 to insert or remove the engaging protrusion 79 into or from the groove portion 80a and that has an outer end opening on the side opposite from the caliper body 16, and a groove portion 80b that has one end connected to an inner end of the groove portion 80a at a right angle and extends circumferentially of the brush holder 48.

Thus, the motor cover 78 is operated so that the engaging protrusion 79 inserted into the groove portion 80a is displaced toward the other end of the groove portion 80b, whereby the motor cover 78 is bayonet-connected to the brush holder 48 of the motor housing 46.

Figure 10:
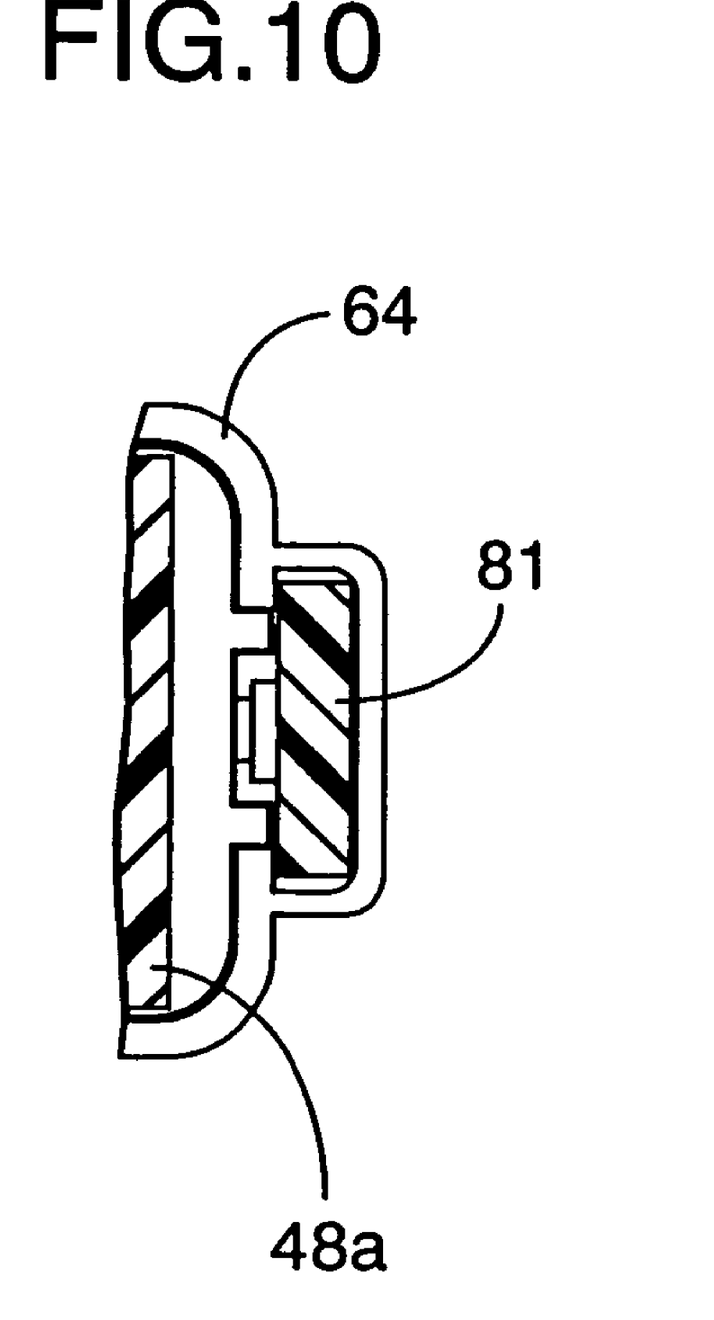
FIG. 10 is a sectional view taken along the line 10-10 in FIG. 5.

An engaging portion 81 protruding outward is integrally provided in the motor cover 78. The engaging portion 81 engages the external connector 64 that is fitted and connected to the coupler 48a of the brush holder 48 in a state where the motor cover 78 being bayonet-connected to the brush holder 48, as shown in FIG. 10.

Further, the engaging portion 81 is provided in the motor cover 78 so that the external connector 64 cannot be fitted to the coupler 48a when the motor cover 78 is imperfectly bayonet-connected to the motor housing 46.

Figure 11:
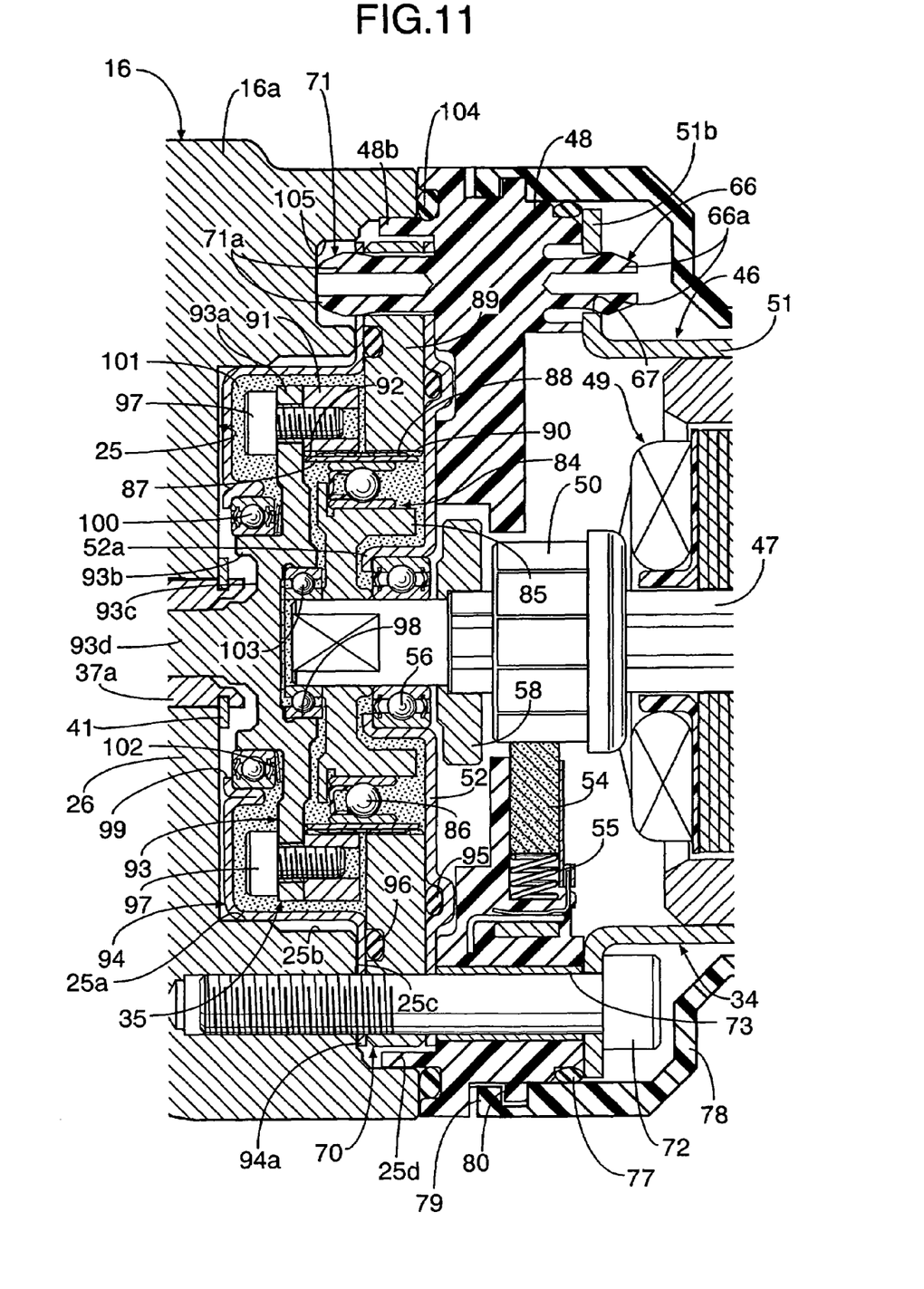
FIG. 11 is an enlarged view of essential portions in FIG. 1.

In FIG. 11, the reduction mechanism 35 is a wave gear mechanism including a wave generator 84 that has a ball bearing 86 mounted to an outer periphery of an oval cam 85 coaxially connected to the output shaft 47 of the electric motor 34, a flexspline 87 that has a plurality of teeth 88 on an outer periphery thereof and is mounted to an outer ring of the ball bearing 86, a fixed side circular spline 89 constituting part of the case 70, is secured to the caliper body 16, and has, on an inner periphery thereof, teeth 90 that mesh with the teeth 88 on one half of the flexspline 87, an output side circular spline 91 that has, on an inner periphery thereof, teeth 92 that mesh with the teeth 88 on the other half of the flexspline 87, and an output rotating member 93 connected to the output side circular spline 91. The reduction mechanism 35 is housed in the case 70. The number of the teeth 90 on the inner periphery of the fixed side circular spline 89 is the same as the number of the teeth 88 on the outer periphery of the flexspline 87. The number of the teeth 92 on the inner periphery of the output side circular spline 91 is larger by two than the number of the teeth 88 on the outer periphery of the flexspline 87.

The case 70 includes the lid plate 52 constituting part of the motor housing 46, the fixed side circular spline 89 that abuts against the lid plate 52, and a case member 94 formed into a cup shape having a flange 94a that protrudes radially outward from an opening end so as to hold the fixed side circular spline 89 between itself and the lid plate 52. The case 70 is mounted to the caliper body 16 by the mounting bolts 72 for mounting the motor housing 46 of the electric motor 34 to the caliper body 16. Further, annular seal members 95 and 96 are mounted between the lid plate 52 and the fixed side circular spline 89 and between the fixed side circular spline 89 and the flange 94a of the case member 94.

The output shaft 47 is rotatably supported by the second motor bearing 56 having a seal in the bearing housing 52a in the center of the lid plate 52. The other end of the output shaft 47 protrudes into the case 70, is coaxially and relatively nonrotatably fitted to the center of the oval cam 85 in the wave generator 84, and thus the wave generator 84 is coaxially connected to the output shaft 47.

The output rotating member 93 integrally includes a ring plate portion 93a fastened to the output side circular spline 91 by a plurality of bolts 97, a cylindrical portion 93b that protrudes from an inner periphery of the ring plate portion 93a toward the side opposite from the wave generator 84, an end wall portion 93c that forms a recess 98 facing the wave generator 84 in cooperation with the inner periphery of the ring plate portion 93a so as to close a base end of the cylindrical portion 93b, and a shaft portion 93d that protrudes from the center of the end wall portion 93c toward the side opposite from the wave generator 84. A circular opening portion 99 for coaxially arranging the cylindrical portion 93b is provided in the center of the case member 94.

A ball bearing having a seal 100 is mounted between an inner periphery of the opening portion 99 in the case member 94 and the cylindrical portion 93b of the output rotating member 93. Thus, the case 70 is sealed by the ball bearing 100, the seal members 95 and 96 mounted between the fixed side circular spline 89 and the lid plate 52 and between the fixed side circular spline 89 and the flange 94a of the case member 94, and the second motor bearing having a seal 56 mounted between the center of the lid plate 52 and the output shaft 47. Grease 101 is charged into the case 70.

The shaft portion 93d of the output rotating member 93 fluid-tightly protrudes from the case 70, and is coaxially and relatively nonrotatably fitted to the connecting shaft portion 37a of the screw shaft 37 in the screw mechanism 36. Specifically, the output shaft 47 of the electric motor 34 is coaxially and nonrotatably fitted and connected to the oval cam 85 that is an input member of the reduction mechanism 35. The output rotating member 93 of the reduction mechanism 35 is relatively nonrotatably fitted and connected to the screw shaft 37 coaxially with the output shaft 47.

In housing the reduction mechanism 35 in the case 70, at least one of the components of the reduction mechanism 35 is preferably axially movable in a limited range in the case 70 in order to accommodate dimension errors and assembly errors of a plurality of components constituting the reduction mechanism 35 and the case 70 for reliable housing. The output rotating member 93 is axially movable in a limited range in the case 70. A Belleville spring 102 urging the output rotating member 93 in one axial direction (toward the ball bearing 98 in this embodiment) is provided between the ball bearing 100 located at a fixed position with respect the case 70 and the ring plate portion 93a of the output rotating member 93.

The other end of the output shaft 47 protruding from the oval cam 85 is coaxially inserted into the recess 98 of the output rotating member 93. A ball bearing 103 is mounted between an outer periphery of the other end of the output shaft and the inner periphery of the recess 93. Thus, the oval cam 85 of the wave generator 84 is coaxially fitted and connected to the output shaft 47, the flexspline 87 is mounted to an outer periphery of the wave generator 84, and the output side circular spline 91 and the output rotating member 93 fastened to each other by the bolts 97 are supported by the output shaft 47 via the ball bearing 103, whereby the wave generator 84, the flexspline 87, the output side circular spline 91, and the output rotating member 93 that are rotating components among the plurality of components constituting the reduction mechanism 35 are coaxially supported by the other end of the output shaft 47 protruding into the case 70.

The housing recess 25 provided in the housing portion 16a of the caliper body 16 includes a small diameter portion 25a that has an inner diameter in which part of the case member 94 in the case 70 of the reduction mechanism 35 is fitted and has one end closed by the bulkhead 26, a middle diameter portion 25b that has a larger diameter than the small diameter portion 25a and has one end connected to the other end of the small diameter portion 25a with a step, an annular step 25c connected to the other end of the middle diameter portion 25b so that the flange 94a of the case member 94 abuts against the annular step 25c, and a large diameter portion 25d that has one end connected to an outer periphery of the annular step 25c and the other end opening in the end surface of the housing portion 16a on the side of the electric motor 34. A fitting cylindrical portion 48b integrally provided in the brush holder 48 constituting part of the motor housing 46 of the electric motor 34 is fitted to the large diameter portion 25d.

When the motor housing 46 of the electric motor 34 is mounted to the housing main portion 16a of the caliper body 16, the shaft portion 93d of the output rotating member 93 in the reduction mechanism 35 is coaxially fitted and connected to the rear end of the screw shaft 37 in the screw mechanism 36, part of the case member 94 in the case 70 of the reduction mechanism 35 is fitted to the small diameter portion 25a of the housing recess 25, and further the fitting cylindrical portion 48b of the brush holder 48 in the motor housing 46 is fitted to the large diameter portion 25d of the housing recess 25. A fitting length of the shaft portion 93d of the output rotating member 93 to the screw shaft 37 is set larger than a fitting length of part of the case member 94 to the housing recess 25 and a fitting length of the fitting cylindrical portion 48b of the brush holder 48 to the housing recess 25. Specifically, when the motor housing 46 of the electric motor 34 to which the case 70 of the reduction mechanism 35 is temporarily secured is assembled to the housing main portion 16a, the shaft portion 93d of the output rotating member 93 is fitted to the screw shaft 37 prior to the fitting of part of the case member 94 to the housing recess 25 and the fitting of the fitting cylindrical portion 48b of the brush holder 48 to the housing recess 25.

An annular seal member 104 that surrounds the case 70 of the reduction mechanism 35 is mounted between the housing main portion 16a of the caliper body 16 and the brush holder 48 in the motor housing 46 of the electric motor 34. Further, recesses 105 that house tips of a plurality of fitting protrusions 71 for temporarily securing the case 70 to the motor housing 46 are provided in the annular step 25c of the housing recess 25 in the housing main portion 16a.

Figure 12:
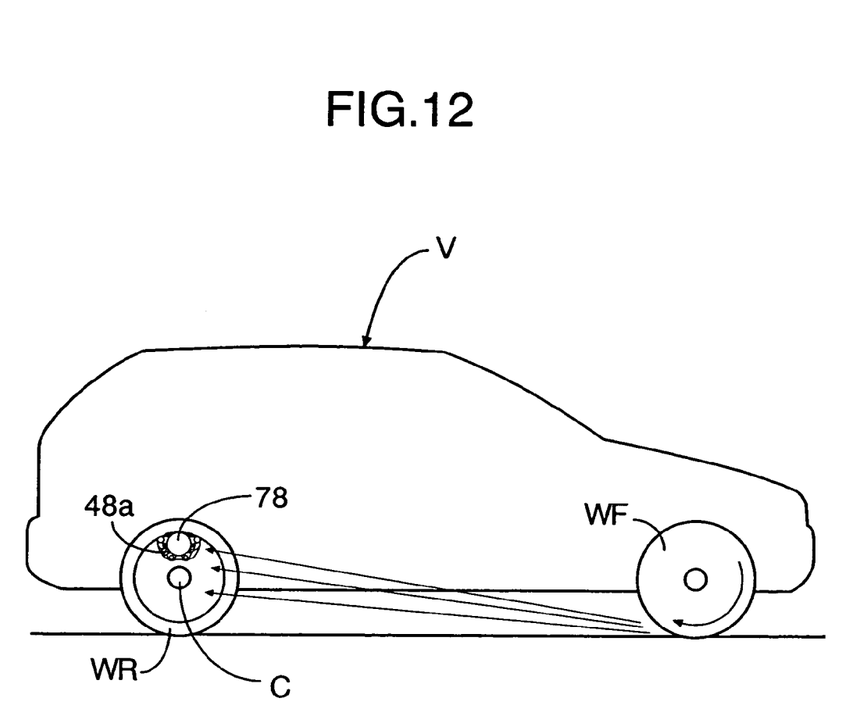
FIG. 12 is a side view of a vehicle with the disk brake being mounted to a rear wheel.

Such a disk brake is mounted to a rear wheel WR of a vehicle as shown in FIG. 12. When the disk brake is mounted to the rear wheel WR, the coupler 48a is placed above the center of rotation C of the rear wheel WR and to the rear of the vehicle, and the opening portion of the coupler 48a is oriented diagonally downward at the rear.

Next, an operation of the embodiment will be described. The screw shaft 37 coaxial with the brake piston 29 and the nut 38 screwed onto the screw shaft 37 are provided behind the brake piston 29 slidably and nonrotatably fitted to the housing main portion 16a of the caliper body 16, and the nut 38 nonrotatably engages the brake piston 29. The nut 38 has the engaging portion 38a having the regular polygonal (square in this embodiment) outer periphery. The locking grooves 43 in the number that is an integral multiple of the number of the plurality of corners 42 of the engaging portion 38a are provided in the inner periphery of the bottomed cylindrical brake piston 29 so as to axially extend at circumferentially equal intervals and selectively engage the corners 42 in a plurality of positions with circumferentially displaced phases.

Thus, the nut 38 can be nonrotatable with a simple structure in which the corners 42 of the engaging portion 38a provided in the nut 38 and having the regular polygonal outer periphery simply engage the locking grooves 43 in the inner periphery of the nonrotatable brake piston 29. Further, the locking grooves 43 in the number that is an integral multiple of the number of the plurality of corners 42 of the engaging portion 38a are provided in the inner periphery of the brake piston 29, thereby facilitating alignment in engagement between the brake piston 29 and the engaging portion 38a and improving assemblability. Further, the locking grooves 43 to which no engaging portion 38a is locked improve an air release property.

The Belleville spring 44 that urges the nut 38 in the advancing direction is provided between the nut 38 and the screw shaft 37, and the action of the Belleville spring 44 prevents an excessively large fastening force from acting between the nut 38 and the screw shaft 37 screwed to each other in return of the brake piston 29, thereby preventing unnecessary loads at restart.

The motor housing 46 of the electric motor 34 that produces power for axially driving the brake piston 29 is mounted to the caliper body 16 by the plurality of mounting bolts 72 with the metal yoke 51 constituting part of the motor housing 46 being placed outside the caliper body 16. The motor cover 78 is mounted to the motor housing 46 via the seal member 77 so as to cover at least the yoke 51 and the mounting bolts 72. This eliminates the need for using corrosion-resistant material to form the yoke 51 and the mounting bolts 72, and protects the yoke 51 and the mounting bolts 72 from rust while avoiding an increase in costs.

The motor cover 78 is bayonet-connected to the motor housing 46 including the brush holder 48 which has the coupler 48a for removably fitting and connecting the external connector 64 in a laterally protruding manner. The engaging portion 81 is integrally provided in the motor cover 78 so as to be capable of engaging the external connector 64 fitted and connected to the coupler 48a in a state where the motor cover 78 is bayonet-connected to the motor housing 46. Specifically, in a state where the motor cover 78 is bayonet-connected to the motor housing 46, the engaging portion 81 of the motor cover 78 can engage the external connector 64 fitted and connected to the coupler 48a of the motor housing 46, thereby simplifying a rotation-preventing structure of the motor cover 78.

Further, the engaging portion 81 is provided in the motor cover 78 so that the external connector 64 cannot be fitted to the coupler 48a when the motor cover 78 is imperfectly bayonet-connected to the motor housing 46, and whether the motor housing 46 is perfectly or imperfectly bayonet-connected to the motor cover 78 can be identified by whether the external connector 64 can be fitted to the coupler 48a, thereby preventing erroneous assembly.

The plurality of repulsive engaging portions 66 capable of repulsively engaging the yoke 51 are projectingly provided in circumferentially spaced positions in the brush holder 48 so that intervals between at least one of the repulsive engaging portions 66 and other adjacent ones of the repulsive engaging portions 66 are respectively different from remaining intervals between the repulsive engaging portions 66. Thus, the circumferential relative position between the yoke 51 and the brush holder 48 is determined to be fixed in a state where the repulsive engaging portions 66 in the brush holder 48 repulsively engages the yoke 51, and the relative position between the brushes 54 held by the brush holder 48 and the magnets 63 secured to the inner periphery of the yoke 51 is determined to be fixed. It is possible to easily and fixingly determine the relative position between the brush holder 48 and the yoke 51 to improve efficiency of assembly, and to set an output characteristic of the electric motor 34 as predetermined.

The electric motor 34 is interlocked and connected to the rear of the screw shaft 37 via the reduction mechanism 35. The output shaft 47 of the electric motor 34 is relatively nonrotatably fitted and connected to the wave generator 84 of the reduction mechanism 35, and the output rotating member 93 of the reduction mechanism 35 is relatively nonrotatably fitted and connected to the screw shaft 37 coaxially with the output shaft 47. This simplifies assembly in which the electric motor 34 is connected to the screw mechanism 36 connected to the brake piston 29 via the reduction mechanism 35, thereby improving the assemblability.

Further, the electric motor 34 includes the motor housing 46 mounted to the caliper body 16, the output shaft 47 rotatably supported in the motor housing 46, and the brush holder 48 that holds the brushes 54 that come into slide contact with the commutator 50 in the armature 49 provided on the output shaft 47 and is secured to the motor housing 46. The plurality of repulsive engaging portions 66 are projectingly provided in the brush holder 48 to be capable of temporarily securing the case 70 to the electric motor 34, while removably repulsively engages the case 70 that houses the reduction mechanism 35 with part of the output rotating member 93 protruding out of the case 70. Thus, the electric motor 34 to which the reduction mechanism 35 is temporarily secured can be assembled to the caliper body 16, thereby further improving the assemblability.

The electric motor 34 to which the case 70 is temporarily secured can be assembled to the caliper body 16 while the brush holder 48 and the case member 94 that are members other than the output rotating member 93 are fitted to the caliper body 16, and the fitting length of the output rotating member 93 of the reduction mechanism 35 to the screw shaft 37 is set larger than the fitting lengths of the brush holder 48 and the case member 94 to the caliper body 16. Thus, when the temporarily secured reduction mechanism 35 and the electric motor 34 are assembled to the caliper body 16, the output rotating member 93 of the reduction mechanism 35 can be first relatively nonrotatably fitted to the screw shaft 37, thereby guiding the fitting of the brush holder 48 and the case member 94 to the caliper body 16 to further improve the assemblability.

Further, the brush holder 48 constituting part of the motor housing 46 together with the yoke 51 is fitted to the caliper body 16, and thus the mounting position of the motor housing 46 to the caliper body 16 is precisely determined to facilitate positioning of the armature 49.

Further, the motor housing 46 having the brush holder 48 and the case 70 of the reduction mechanism 35 are secured to the caliper body 16 by the common mounting bolts 72, thereby reducing the number of components.

In such an electric motor 34, the pulser 58 to be detected by the rotation angle detection sensor 57 housed and placed in the motor housing 46 is provided on the output shaft 47 in the motor housing 46. Thus, the rotation angle detection sensor 57 is housed in the motor housing 46 with a waterproof seal to eliminate the need for a special waterproof seal for the rotation angle detection sensor 57, thereby reducing the number of components.

The rotation angle detection sensor 57 is housed and secured in the recess 59 provided in the brush holder 48 so as to be covered with the lid plate 52 constituting part of the motor housing 46. Thus, the rotation angle detection sensor 57 is merely housed and secured in the recess 59 in the brush holder 48 before assembly of the motor housing 46, by connecting the yoke 51 and the lid plate 52 via the brush holder 48, thereby facilitating assembly of the rotation angle detection sensor 57.

Further, the pulser 58 is provided on the output shaft 47 between the commutator 50 and the first motor bearing 56 provided between the commutator 50 and the lid plate 52 of the motor housing 46, and thus the pulser 58 is provided on the output shaft 47 extremely close to the first motor bearing 56. This enhances detection accuracy of the rotation angle detection sensor 57 while minimizing run-out of the pulser 58.

The coupler 48*a* for removably mounting the external connector 64 is integrally provided in the brush holder 48, thereby simplifying the structure and reducing the number of components.

The motor housing 46 of the electric motor 34 is constituted by connecting together the bottomed cylindrical yoke 51 that rotatably supports, at a closed end thereof, one end of the output shaft 47 and that coaxially surrounds the armature 49, the brush holder 48 that holds the brushes 54 coming into slide contact with the commutator 50, and the lid plate 52 that holds the brush holder 48 between itself and the opening end of the yoke 51 and that rotatably supports the other end of the output shaft 47. The bulkhead 26 through which the rear of the screw shaft 37 rotatably and fluid-tightly passes, the screw shaft 37 constituting the screw mechanism 36 together with the nut 38 housed in the hydraulic chamber 28 so as to relatively nonrotatably abut against the brake piston 29 from backward, and the housing recess 25 that holds the bulkhead 26 with the hydraulic chamber 28, are provided in the caliper body 16.

The motor housing 46 is mounted to the caliper body 16 via the annular seal member 104 surrounding the opening end of the housing recess 25 so that the case 70 which includes the lid plate 52 as a component and into which the other end of the output shaft 47 fluid-tightly protrudes is housed in the housing recess 25. The reduction mechanism 35 having the output rotating member 93 that reduces the speed of the rotation power input from the other end of the output shaft 47 and outputs the rotation power is sealed in the case 70 while part of the output rotating member 93 fluid-tightly protrudes from the case 70 so as to be coaxially operatively connected to the rear of the screw shaft 37. The grease 101 is charged into the case 70.

Specifically, the case 70 sealing the reduction mechanism 35 includes, as a component, the lid plate 52 that is part of the motor housing 46 of the electric motor 34, and is fluid-tightly housed in the housing recess 25 in the caliper body 16 corresponding to the mounting of the motor housing 46 to the caliper body 16. This allows the case 70 to be easily configured while preventing the grease 101 charged in the case 70 from leaking, and facilitates mounting of the case 70 to the caliper body 16.

The other end of the output shaft 47 coaxially supports the wave generator 84, the flexspline 87, the output side circular spline 91, and the output rotating member 93 that are rotating components among the plurality of components constituting the reduction mechanism 35, and protrudes into the case 70. This facilitates coaxial alignment of the components of the reduction mechanism 35, and prevents a reduction in transmission efficiency caused by displacement of the shaft.

Further, the Belleville spring 102 urging the output rotating member 93 in one axial direction is provided between the ball bearing 100 secured to a fixed position with respect to the case 70 and the output rotating member 93, and the output rotating member 93 of the reduction mechanism 35 is made axially movable in a limited range in the case 70. This allows the reduction mechanism 35 to be reliably housed in the case 70 while accommodating dimension errors and assembly errors of the plurality of components constituting the reduction mechanism 35 and the case 70, and prevents rattling of the output rotating member 93 in operation thereby preventing generation of operation noise and a reduction in operational efficiency.

Further, when the disk brake is mounted to the rear wheel WR, the coupler 48*a* is placed above the center of rotation C of the rear wheel WR and to the rear of the vehicle. Thus, it is possible to protect the coupler 48*a* by an axle or the like of the rear wheel WR, as shown in FIG. 12, to make it difficult for stones flying from the front wheel WF to hit the coupler 48*a*, that is, to prevent collision of flying stones against the coupler 48*a* with a simple structure while avoiding an increase in the number of components.

Further, the opening portion of the coupler 48*a* is oriented diagonally downward at the rear, thereby preventing flying stones from hitting the external connector 64 connected to the coupler 48*a*.

The embodiment of the present invention has been described above, but the present invention is not limited to the embodiment, and various changes in design may be made without departing from the subject matter of the present invention.

For example, in the embodiment, the disk brake has been described that can provide the service braking state by the hydraulic pressure with the arrangement in which the rear surface of the brake piston 29 faces the hydraulic chamber 28, and that is operated by the electric motor 34 to provide the parking brake state. However, the present invention is also applicable to an electric disk brake electrically performing both service braking and parking braking, and to a disk brake exclusively used for a parking brake.

What is claimed is:

1. An electric disk brake for a vehicle, said electric disk brake comprising:
   an electric motor in which a brush, that comes into slide contact with a commutator provided on an output shaft rotatably supported in a motor housing, is held by a brush holder secured to the motor housing;

a rotation angle detection sensor for detecting a rotation angle of the electric motor, the rotation angle sensor disposed inside of the motor housing; and a brake piston driven by the electric motor being slidably fitted to a caliper body, wherein a detected portion to be detected by the rotation angle detection sensor is provided on the output shaft in the motor housing, the detected portion circumferentially disposed from the rotation angle detection sensor relative to an axis of the output shaft in the motor housing;

a bottomed cylindrical yoke having a plurality of magnets on an inner periphery thereof;

a lid plate that is connected to the yoke to cover an opening formed therein and which holds the brush holder between itself and the yoke, the lid plate having a bearing housing integrally provided thereon for housing a motor bearing; and a motor bearing disposed in the bearing housing for rotatably supporting the output shaft therein;

wherein the rotation angle detection sensor is housed and secured in a recess provided in the brush holder so as to be covered with the lid plate.

2. The electric disk brake for a vehicle according to claim 1, wherein the detected portion is provided on the output shaft between the commutator and the motor bearing provided on the lid plate.

3. The electric disk brake for a vehicle according to claim 1, wherein a coupler for removably mounting an external connector is integrally provided in the brush holder.

4. The electric disk brake for a vehicle according to claim 2, wherein a coupler for removably mounting an external connector is integrally provided in the brush holder.

5. An electric disk brake for a vehicle, said electric disk brake comprising an electric motor which includes:

a motor housing comprising a bottomed cylindrical yoke having an opening end and a lid plate for covering the opening end, an output shaft rotatably supported in the motor housing, a commutator provided on the output shaft, a brush holder secured to the motor housing, a brush that comes into slide contact with the commutator and is held by the brush holder, a rotation angle detection sensor for detecting a rotation angle of the electric motor, and a detected portion to be detected by the rotation angle detection sensor provided on the output shaft inside the motor housing; and a brake piston driven by the electric motor being slidably fitted to a caliper body;

wherein the rotation angle detection sensor is housed in a resin case secured in a recess provided in the brush holder so as to be covered with the lid plate and enclosed within the motor housing.

6. The electric disk brake for a vehicle according to claim 5, wherein the detected portion is provided on the output shaft between the commutator and a motor bearing, the motor bearing provided on the lid plate of the motor housing so as to enclose the motor bearing inside the motor housing.

7. The electric disk brake for a vehicle according to claim 5, wherein the brush holder is integrally provided with a coupler for removably mounting an external connector therein.

* * * * *